United States Patent Office 3,393,971
Patented July 23, 1968

3,393,971
PROCESS FOR PURIFYING MOLYBDENUM
TRIOXIDE
Clarence D. Vanderpool and Vincent Chiola, Towanda,
Pa., assignors to Sylvania Electric Products Inc., a corporation of Delaware
No Drawing. Filed Apr. 6, 1966, Ser. No. 540,521
4 Claims. (Cl. 23—22)

This invention relates to a process for producing high-purity molybdenum trioxide and specifically to a process for preparing such materials in which the potassium content is reduced substantially. Particularly, this invention relates to an efficient method of converting commercial grades of molybdenum trioxide to a low-potassium content, high-purity molybdenum trioxide.

Molybdenite, $MoS_2$, is the most common commercial source of molybdenum and typically is found in ores containing only a few pounds of $MoS_2$ per ton, i.e., less than about 0.1–2% by weight. The ore is usually concentrated by flotation to a crude impure concentrate containing about 85–90% $MoS_2$. A technical grade molybdenum oxide is produced by roasting the concentrate in a hearth furnace, using an air atmosphere. Commercially available, technical-grade oxide, typically may contain 10 to 15 weight percent silica, 0.07–0.3% potassium, >50 p.p.m. Mn, >100 p.p.m. Pb, >100 p.p.m. Sn, >200 p.p.m. Fe, >760 p.p.m. Cu and >250 p.p.m. Al.

National Stockpile Specification P–74–R5 lists the following requirements for technical-grade $MoO_3$:Mo—60 wt. percent min.: Cu—0.50% max.: Pb—0.15%, S .25% (Bulletin 630, Mineral Facts and Figures 1965, Bureau of Mines, Chapter of Molybdenum). No mention is made of potassium content.

For many applications, a technical-grade $MoO_3$ is inadequate and a purified $MoO_3$ is required. Particular attention has been given in recent years to the potassium content of $MoO_3$, and generally $MoO_3$ having less than 10–13 p.p.m. potassium is specified. Purified oxide of this quality is specified for manufacture of molybdenum powder which goes into the production of wire, rod, sheet, sintered parts and other mill products; special alloys and chemically pure molybdenum salts, such as might be used in catalysts.

Technical grade $MoO_3$ may be converted to pure grade $MoO_3$ by sublimation or chemical methods. The method most commonly used to produce pure grade $MoO_3$ is sublimation. A product of 99.95% purity with potassium content of less than 30 p.p.m. is usually attained. Potassium content ranging down to less than 13 p.p.m. can be produced with careful control of the process.

Basically, we have found that sublimation is a relatively inefficient method of purifying $MoO_3$, with efficiencies only approximately 60–70%. Molybdenum trioxide sublimes most efficiently at temperatures approaching its melting point of 750° C. At low temperatures, sublimation will tend to be slow and incomplete, resulting in poor recovery or yield. At higher temperatures, approaching the melting point, the oxide tends to melt and remain in the roaster. In either case, costly reprocessing of furnace residues is required to recover molybdenum.

Commercially obtainable "pure" grades of oxide, made by the sublimation process do not consistently meet requirements for material having less than 13 p.p.m. or lower potassium content.

The furnace and recovery equipment needed to convert finely divided sublimate to a commercially acceptable product requires high capital investment. The process requires close control and the economics are greatly dependent on handling large volumes. The equipment required is not generally available in chemical or metallurgical processing plants.

According to our invention, we have found that high-temperature firing or roasting of molybdenum trioxide facilitates removal of potassium to extremely low levels. We find that firing is a necessary processing step in the production of high-purity, low potassium-content $MoO_3$, required for special metallurgical uses when the starting material is commercial, technical-grade $MoO_3$.

Typically, the process of our invention for producing molybdenum trioxide having less than 10 p.p.m. potassium includes firing technical-grade molybdenum trioxide at temperatures of 500 to 740° C. for 1 to 24 hours in air. The fired product is washed and filtered. The washed product is then reacted with ammonium hydroxide to form ammonium molybdate, and the solution filtered again to remove insoluble hydroxides and silica. Subsequently, the filtrate is acidified, generally with hydrochloric acid, to a pH of about 2 to 3. The molybdenum precipitates as ammonium polymolybdate which is filtered off, washed and dried. When the ammonium polymolybdate is fired in air, it is oxidized to molybdenum trioxide.

Accordingly, the primary objects of our invention are the removal of potassium contaminates from molybdenum trioxide and the realization of a process for attaining such goals.

The many other objects, features and advantages of our invention will become manifest to those conversant with the art from the following description and the specific examples of our invention.

We have found that an impure or technical grade of molybdenum trioxide should be roasted at a temperature below the sublimation point of the molybdenum trioxide, generally between about 500 to 740° C. Afterwards the fired product is washed with water and the fired $MoO_3$ recovered by filtration. The $MoO_3$ is reacted with ammonium ions, generally as ammonium hydroxide, to form an ammonium molybdate solution. Insoluble materials are filtered out and the solution is acidified with a strong mineral acid, generally hydrochloric, to a pH of about 2 to 3, whereby ammonium polymolybdate is precipitated. The ammonium polymolybdate is filtered, dried and converted to molybdenum trioxide by roasting at a temperature less than the sublimation point of the trioxide, generally about 500 to 740° C.

In order to explain the invention more fully the following examples are offered; however, they are not intended to be limitative upon the claims.

EXAMPLE I 500 grams of technical-grade trioxide are fired overnight (16 hours) at 600° C. in a box furnace. Material loss due to volatilization or sublimation was 6.4 grams or 1.28% by weight. Potassium content of the starting oxide was 2300 p.p.m. The fired trioxide was digested in 2500 ml. of water at boiling for one hour. After filtering to recover the trioxide, washing was repeated three times. The filtrate was deep yellow after the first wash, and clear, or only slightly colored after the second and third wash. Dry molybdenum trioxide recovered after three washes contained only 40 p.p.m. K.

The $MoO_3$ recovered from firing and washing was dissolved in a solution containing 1 part $H_2O$, and 1 part 28% $NH_4OH$ by volume. Silica and insoluble hydroxides were removed by filtration. An ammonium polymolybdate product was recovered by addition of hydrochloric acid to the clear filtrate to a pH of 2.5. After filtration, polymolybdate was converted to $MoO_3$ by firing at 1150° C. Potassium content of the oxide was <10 p.p.m.

EXAMPLE II 454 grams of technical-grade molybdenum trioxide having 2540 p.p.m. K. was fired at 700° C. overnight, in a silica tray. A material loss of 12 grams or 2.6% occurred. The fired trioxide was digested in 2500 cc. of boiling water for 1 hour and filtered using filter paper. Washing in this manner was repeated for a total of 3 times. The potassium on the washed trioxide was 13 p.p.m. The washed trioxide was dissolved in 1:1 (Reagent grade $NH_4OH/H_2O$) while warming. The silica and insoluble hydroxides were filtered out. The clear filtrate was adjusted to a pH of 2.5 with reagent grade HCl to precipitate ammonium polymolybdate. This was recovered by filtration and dried at 70° C. overnight. P.p.m. K. was <10 in the $MoO_3$ made by firing the polymolybdate. Residue recovered from wash water in the washing step on fired $MoO_3$ was found to contain >2500 p.p.m. K.

The higher firing temperature used in Example II shows that potassium is more efficiently removed by washing oxide fired at higher temperature i.e., 700° C. Material loss on firing would tend to be greater at the higher firing temperature.

EXAMPLE III 50 pounds of a technical grade $MoO_3$, containing 750 p.p.m. potassium were fired at 600° C. for 2 hours. Three pounds were washed in 1 pound batches using 2500 ml. of hot $H_2O$ per pound of fired material. Washes were removed by decantation. A total of 3 washes per batch was required. The combined oxides, washed and fired and containing 15 p.p.m. K., were dissolved in a 1:1 by volume mixture of 28% $NH_4OH/H_2O$. Insoluble hydroxides and $SiO_2$ were removed by filtration. A polymolybdate was precipitated from the filtrate by addition of HCl to pH 2.5 $MoO_3$ having <10 p.p.m. potassium was recovered by firing the polymolybdate.

The following are analytical data resulting from tests conducted on the products of two of the specific samples.

TABLE I

|  | Pure-Grade $MoP_3$ | Technical Grade, $MoO_3$ | Ex. I, $MoO_3$ | Ex. III, $MoO_3$ |
|---|---|---|---|---|
| Si | 88 | 250 | 10 | 5 |
| Mn | <2 | 50 | <2 | <2 |
| Mg | <0.2 | 5 | <0.2 | 0.8 |
| Pb | 19 | 100 | <5 | <5 |
| Sn | 30 | 100 | <6 | <6 |
| Cr | <6 | <6 | <6 | <6 |
| Ni | <4 | 14 | <4 | <4 |
| Fe | 10 | 200 | <8 | <8 |
| Cu | <4 | 60 | <4 | <4 |
| Al | <10 | 250 | <10 | <10 |
| Ca | <2 | 20 | <2 | <2 |
| K | 26 | 2,300 | <10 | <10 |
| W | <100 |  | <100 | <100 |

It is apparent that modifications and changes may be made within the spirit and scope of the instant invention.

As our invention we claim:

1. A process for purifying molybdenum trioxide, the steps which comprise: firing in an oxidizing atmosphere impure molybdenum trioxide at temperatures of from 500 to 740° C. and below the sublimation point of said material; water washing and filtering the product of said firing; reacting the washed fired product with ammonium ions to form a solution of ammonium molybdate; filtering said solution of ammonium molybdate and recovering the filtrate; acidifying said solution and precipitating ammonium polymolybdate; filtering, washing and drying said ammonium polymolybdate and firing in an oxidizing atmosphere, whereby the ammonium polymolybdate is oxidized to purified molybdenum trioxide.

2. The process according to claim 1 wherein the source of ammonium ions is ammonium hydroxide.

3. The process according to claim 1 wherein the ammonium molybdate solution is acidified to a pH of about 2 to 3 with hydrochloric acid.

4. The process according to claim 1 wherein the impure molybdenum trioxide contains potassium contamination and said purified molybdenum trioxide has less than about 10 p.p.m. of potassium.

References Cited
UNITED STATES PATENTS

| 1,888,978 | 11/1932 | Davis | 23—22 |
| 1,923,652 | 8/1933 | Winkler et al. | 23—24 |
| 3,139,326 | 6/1964 | Costello | 23—140 X |
| 3,351,423 | 11/1967 | Zimmerley et al. | 23—140 X |

OSCAR R. VERTIZ, *Primary Examiner.*

HERBERT T. CARTER, *Assistant Examiner.*